US012585013B2

(12) United States Patent
Watabe et al.

(10) Patent No.: US 12,585,013 B2
(45) Date of Patent: Mar. 24, 2026

(54) DISPLACEMENT DETECTION DEVICE AND METHOD

(71) Applicant: Murata Manufacturing Co., Ltd., Nagaokakyo (JP)

(72) Inventors: Yuuma Watabe, Nagaokakyo (JP); Takaaki Asada, Nagaokakyo (JP); Shinichi Sasaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 187 days.

(21) Appl. No.: 18/536,530

(22) Filed: Dec. 12, 2023

(65) Prior Publication Data

US 2024/0118415 A1 Apr. 11, 2024

Related U.S. Application Data

(63) Continuation of application No. PCT/JP2022/010878, filed on Mar. 11, 2022.

(30) Foreign Application Priority Data

Sep. 9, 2021 (JP) ................................. 2021-147107

(51) Int. Cl.
*G01S 15/62* (2006.01)
*G01S 7/524* (2006.01)
*G01S 7/53* (2006.01)

(52) U.S. Cl.
CPC .............. *G01S 15/62* (2013.01); *G01S 7/524* (2013.01); *G01S 7/53* (2013.01)

(58) Field of Classification Search
CPC ........ G01S 7/526; G01S 7/527; G01S 15/104; G01S 15/88; G01S 15/50; G01S 15/126; G01S 15/62

(Continued)

(56) References Cited

U.S. PATENT DOCUMENTS

2007/0291591 A1* 12/2007 Peng ..................... G01S 15/104
367/101
2012/0055250 A1* 3/2012 Hashimoto ............. G01S 7/526
73/597

(Continued)

FOREIGN PATENT DOCUMENTS

CN 104808170 A 7/2015
CN 105748100 A * 7/2016

(Continued)

OTHER PUBLICATIONS

CN-105748100-A (machine translation) (Year: 2016).*

(Continued)

*Primary Examiner* — Yuqing Xiao
*Assistant Examiner* — Christopher Richard Walker
(74) *Attorney, Agent, or Firm* — Keating & Bennett, LLP

(57) ABSTRACT

A displacement detection device includes a transmitter, a receiver, and a controller configured or programmed to output a first transmission signal to the transmitter to transmit a modulated wave and acquire a responsive first reception signal in a first measurement period, extract first phase information indicating a phase defined in a correlation between a first transmission signal and a reception signal, output a second transmission signal to the transmitter and acquire a responsive second reception signal in a second measurement period after the first measurement period, extract second phase information indicating a phase defined in a correlation between the second transmission signal and reception signal, and detect a displacement of an object between the first and second measurement periods, depending on a difference between the first and second phase information.

17 Claims, 14 Drawing Sheets

(58) Field of Classification Search
USPC ............................................... 367/87
See application file for complete search history.

(56) References Cited

U.S. PATENT DOCUMENTS

| | | | |
|---|---|---|---|
| 2012/0215101 A1* | 8/2012 | Maleke | A61B 8/485 |
| | | | 600/438 |
| 2016/0037267 A1* | 2/2016 | Aliev | H04R 23/002 |
| | | | 977/932 |
| 2017/0234981 A1* | 8/2017 | Kydar | A61B 5/1126 |
| | | | 340/573.1 |
| 2019/0339386 A1* | 11/2019 | Ding | G01S 15/325 |
| 2020/0209388 A1* | 7/2020 | Ding | G01S 15/582 |

FOREIGN PATENT DOCUMENTS

| | | |
|---|---|---|
| JP | 5483795 A | 7/1979 |
| JP | 09166661 A | 6/1997 |
| JP | 2004191145 A | 7/2004 |

OTHER PUBLICATIONS

International Search Report in PCT/JP2022/010878, mailed 2022-04-19, 3 pages.
Kanai et al., "Transcutaneous Measurement and Spectrum Analysis of Heart Wall Vibrations," IEEE Transactions on Ultrasonics, Ferroelectrics, and Frequency Control, Sep. 1996, vol. 43, No. 5, pp. 791-810.
Written Opinion in PCT/JP2022/010878, mailed Apr. 19, 2022, 3 pages.

* cited by examiner

TRANSMISSION
SIGNAL

Sd

RECEPTION
SIGNAL

Sr

ANALYTIC-SIGNAL-PHASE
EXTRACTING PROCESSING
(S3) START

S11    DETECT PEAK TIME FROM AMPLITUDE
OF ANALYTIC SIGNAL

S12    EXTRACT PHASE AT SAMPLING POINT IN
ANALYTIC SIGNAL AT VICINITY OF PEAK TIME

S13    CALCULATE INSTANTANEOUS FREQUENCY BASED
ON REGRESSION LINE REGARDING PHASES AT
RESPECTIVE SAMPLING POINTS

END (TO S4)

AMPLITUDE

PHASE

FIG. 11

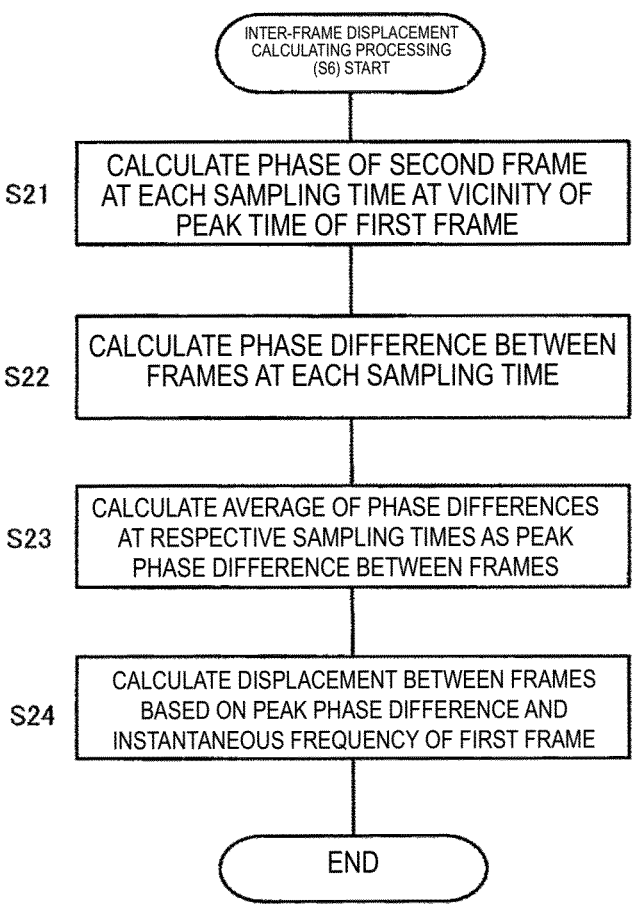

INTER-FRAME DISPLACEMENT
CALCULATING PROCESSING
(S6) START

S21    CALCULATE PHASE OF SECOND FRAME
AT EACH SAMPLING TIME AT VICINITY OF
PEAK TIME OF FIRST FRAME

S22    CALCULATE PHASE DIFFERENCE BETWEEN
FRAMES AT EACH SAMPLING TIME

S23    CALCULATE AVERAGE OF PHASE DIFFERENCES
AT RESPECTIVE SAMPLING TIMES AS PEAK
PHASE DIFFERENCE BETWEEN FRAMES

S24    CALCULATE DISPLACEMENT BETWEEN FRAMES
BASED ON PEAK PHASE DIFFERENCE AND
INSTANTANEOUS FREQUENCY OF FIRST FRAME

END

DISPLACEMENT DETECTION DEVICE AND METHOD

CROSS REFERENCE TO RELATED APPLICATIONS

This application claims the benefit of priority to Japanese Patent Application No. 2021-147107 filed on Sep. 9, 2021 and is a Continuation Application of PCT Application No. PCT/JP2022/010878 filed on Mar. 11, 2022. The entire contents of each application are hereby incorporated herein by reference.

BACKGROUND OF THE INVENTION

1. Field of the Invention

The present invention relates to a displacement detection device and a method for detecting a minute displacement of an object based on transmission and reception of a wideband ultrasonic wave or the like.

2. Description of the Related Art

H. Kanai, M. Sato, Y. Koiwa and N. Chubachi, "Transcutaneous measurement and spectrum analysis of heart wall vibrations," in IEEE Transactions on Ultrasonics, Ferroelectrics, and Frequency Control, vol. 43, no. 5, pp. 791-810, September 1996, doi: 10.1109/58.535480 discloses a method of transcutaneously measuring a minute displacement caused by minute vibration of a heart wall in ultrasonic diagnosis. In the method disclosed in H. Kanai, M. Sato, Y. Koiwa and N. Chubachi, "Transcutaneous measurement and spectrum analysis of heart wall vibrations," in IEEE Transactions on Ultrasonics, Ferroelectrics, and Frequency Control, vol. 43, no. 5, pp. 791-810, September 1996, doi: 10.1109/58.535480, ultrasonic high-frequency signals are transmitted, and reception signals reflected at the heart wall are received at least twice by an ultrasonic transducer provided on a chest surface. In the method which utilizes a phase difference tracking method, a phase difference between complex signals obtained by application of quadrature demodulation to the reception signals in the two receptions is calculated, and a change in delay time of the reception signals is estimated based on the phase shift of the reception signals. In this manner, the method described in H. Kanai, M. Sato, Y. Koiwa and N. Chubachi, "Transcutaneous measurement and spectrum analysis of heart wall vibrations," in IEEE Transactions on Ultrasonics, Ferroelectrics, and Frequency Control, vol. 43, no. 5, pp. 791-810, September 1996, doi: 10.1109/58.535480 aims at detecting a minute displacement at the body surface which contacts the ultrasonic transducer.

SUMMARY OF THE INVENTION

Preferred embodiments of the present invention provide displacement detection devices and methods each able to accurately detect a minute displacement of an object.

A displacement detection device according to a preferred embodiment of the present invention includes a transmitter, a receiver, and a controller. The transmitter transmits to an object, a modulated wave including a plurality of frequencies. The receiver receives a reflection wave from the object and generates a reception signal indicating a reception result. The controller is configured or programmed to control transmission of the modulated wave by the transmitter and acquire the reception signal from the receiver. The controller is configured or programmed to output a first transmission signal to the transmitter to transmit the modulated wave and to acquire a responsive first reception signal in a first measurement period. The controller is configured or programmed to extract, based on the first transmission signal and the first reception signal, first phase information indicating a phase defined in a correlation between the first transmission signal and the first reception signal. The controller is configured or programmed to output a second transmission signal to the transmitter to transmit the modulated wave and acquire a responsive second reception signal in a second measurement period after the first measurement period. The controller is configured or programmed to extract, based on the second transmission signal and the second reception signal, second phase information indicating a phase defined in a correlation between the second transmission signal and the second reception signal. The controller is configured or programmed to detect a displacement of the object between the first and second measurement periods, depending on a difference between the first phase information and the second phase information.

Preferred embodiments of the present invention are each able to be provided by methods, non-transitory media including computer programs, or a combination thereof.

With the displacement detection devices and methods of according to preferred embodiments of the present invention, a minute displacement of an object is able to be accurately detected.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 11 is a flowchart exemplifying inter-frame displacement calculating processing in a displacement detection device according to a preferred embodiment of the present invention.

DETAILED DESCRIPTION OF THE PREFERRED EMBODIMENTS

Hereinafter, preferred embodiments of displacement detection devices according to the present invention are described with reference to the accompanying drawings.

PREFERRED EMBODIMENT

In a preferred embodiment of the present invention, one example of a displacement detection device utilizing a thermophone which is a thermally-exciting-type sound wave generating device is described.

1. Configuration 1-1. Outline

An outline of the displacement detection device according to the present preferred embodiment of the present invention is described with reference to FIG. 1.

Figure 1:
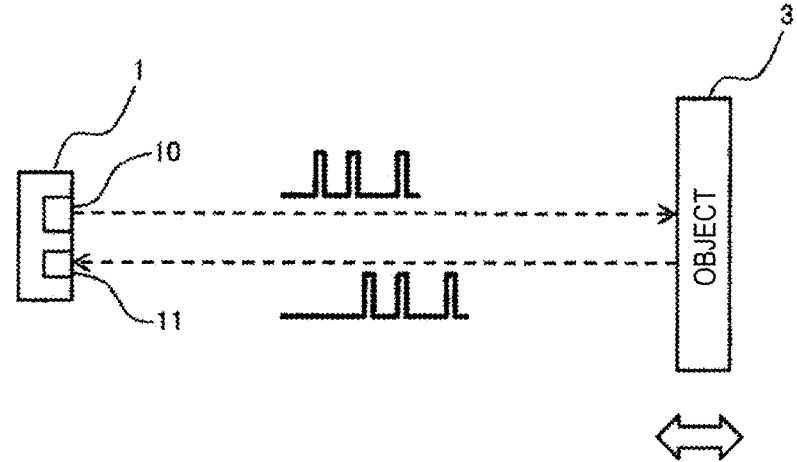
FIG. 1 is a diagram illustrating a displacement detection device according to a preferred embodiment of the present invention.

FIG. 1 is a diagram illustrating an outline of a displacement detection device 1 of the present preferred embodiment. The displacement detection device 1 of the present preferred embodiment is a device which detects, by transmission and reception of a sound wave using the thermophone, information including a distance to an object 3.

The displacement detection device 1 is usable in, for example, measuring heartbeat or breaths of a patient in a medical use. The object 3 as a detection target object in this case includes a body surface of the patient, for example. Moreover, the displacement detection device 1 is applicable not only to the medical use, but also to various uses. For example, in an in-vehicle use, a driver, a passenger, and the like of an automobile may be a detection target object of the displacement detection device 1. Furthermore, the object 3 as the detection target object is not limited to a living body such as a human, for example, but may also be an article or the like. The displacement detection device 1 may be applied to, for example, inspection of a container in an industrial use, and may be utilized to measure a minute change in a distance to a portion of a container surface where a label is attached.

In detection of information such as the minute distance as described above, in the displacement detection device 1, a chirp wave whose frequency changes with time is transmitted to the object 3, and a reflection wave of the chirp wave reflected at the object 3 (that is, an echo) is received. The displacement detection device 1 can generate a sound wave having wideband frequency characteristics such as the chirp wave, by using the thermophone.

The displacement detection device 1 of the present preferred embodiment repeats the transmission and reception of the sound waves as described above to detect a change in a distance to the object 3, that is, displacement of the object 3. A detailed configuration of the displacement detection device 1 is described below.

1-2. Device Configuration

Figure 2:
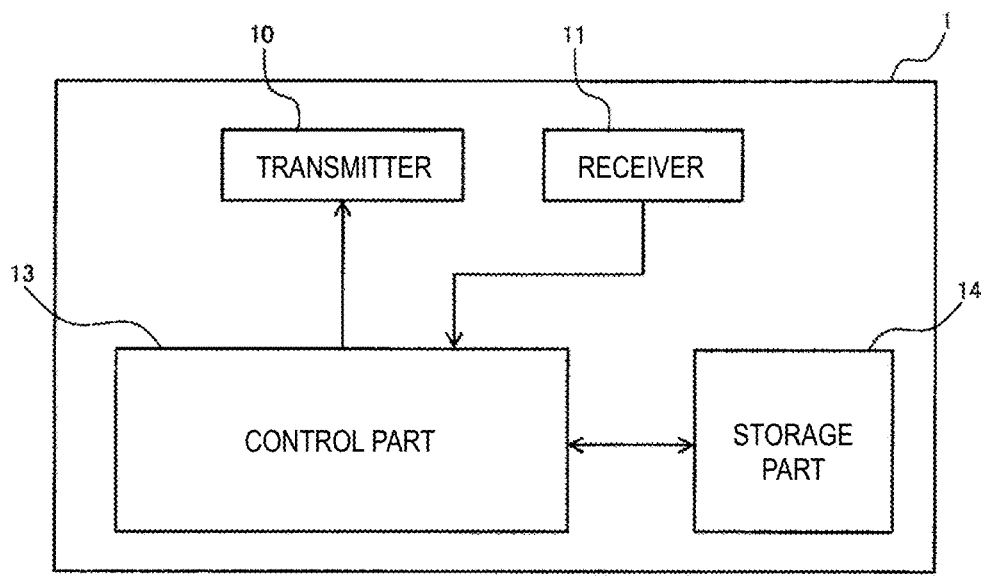
FIG. 2 is a block diagram illustrating a configuration of a displacement detection device according to a preferred embodiment of the present invention.

The configuration of the displacement detection device 1 of the present preferred embodiment is described with reference to FIGS. 1 and 2. FIG. 2 is a block diagram illustrating the configuration of the displacement detection device 1.

For example, as illustrated in FIG. 2, the displacement detection device 1 of the present preferred embodiment includes a transmitter 10, a receiver 11, a controller 13, and a storage 14. For example, as illustrated in FIG. 1, the transmitter 10 and the receiver 11 are disposed on a side surface of the displacement detection device 1 such that the transmitter 10 and the receiver 11 are close to each other, the side surface facing to the object 3. The transmitter 10 and the receiver 11 are communicably connected to the controller 13 through various signal wires, for example.

The transmitter 10 of the present preferred embodiment includes, for example, the thermophone as a sound source. The transmitter 10 generates an ultrasonic wave at a frequency of about 20 kHz or higher, for example. The transmitter 10 can generate, by the thermophone, a chirp wave whose frequency is modulated in a wideband, for example, from about 20 kHz to about 100 kHz. The transmitter 10 of the present preferred embodiment generates a chirp wave by a linear frequency chirp in which a frequency changes linearly with time, for example. Moreover, the transmitter 10 can be reduced in size and weight by using the thermophone.

The transmitter 10 may include a drive circuit which drives the thermophone, and the like. For example, the transmitter 10 generates a sound wave by driving the thermophone by the drive circuit based on a transmission signal inputted from the controller 13. The drive circuit of the transmitter 10 may set a frequency band, a chirp length indicative of a period during which the frequency is changed, an intensity, a signal length, a directivity, and the like of a sound wave to be generated. The transmitter 10 is not necessarily limited to generate ultrasonic waves, but may generate sound waves in various frequency bands. The transmitter 10 may be various types of omnidirectional sound source without a particular directivity, or may be a directional sound source with a variable or fixed directivity.

The transmitter 10 includes, as a configuration of the thermophone which generates a sound wave by heating air, for example, a heating element, a heat-insulating layer, a substrate, and an electrode. The heating element and the heat-insulating layer are stacked on the substrate. The heating element includes a resistive element, and generates heat by current from the drive circuit being applied thereto through the electrode. The heating element provides a sound-emitting surface which contacts air, and air around the sound-emitting surface is expanded or contracted due to change in temperature. Therefore, air pressure, that is, a sound wave is generated from the vicinity of the sound-emitting surface. The heat-insulating layer is provided between the heating element and the substrate, and reduces or prevents heat conduction from the heating element to the side opposite from the sound-emitting surface. The substrate dissipates heat transmitted from the heating element.

The receiver 11 includes, for example, a microphone such as a micro electro mechanical system (MEMS) microphone. The receiver 11 receives an echo from the object 3 and generates a reception signal indicating a reception result. Spacing between the receiver 11 and the transmitter 10 is set in advance, for example, in consideration of an estimated distance from the displacement detection device 1 to the object 3 during detection. The receiver 11 is not limited to include the MEMS microphone, but may include another microphone having frequency characteristics with which wideband ultrasonic waves transmitted from the transmitter 10 are receivable, for example. For example, a capacitor microphone may be used for the receiver 11. The receiver 11 may be omnidirectional, or may suitably have various directivities.

The controller 13 controls the entire operation of the displacement detection device 1. For example, the controller 13 includes a microcomputer, and uses a given function in collaboration with software. The controller 13 reads data and a program stored in the storage 14 and executes various types of arithmetic processing, thus providing various functions. For example, the controller 13 generates a transmission signal that causes the transmitter 10 to generate a chirp wave, and outputs the transmission signal to the transmitter 10. For example, the controller 13 holds the generated transmission signal in the storage 14. Details of the controller 13 will be described later.

The controller 13 may be, for example, a hardware circuit such as a dedicated electronic circuit designed to provide a given function, or an electronic circuit which is reconfigurable. The controller 13 may include various semiconductor integrated circuits, such as, for example, a CPU, an MPU, a DSP, an FPGA, and an ASIC. Moreover, the controller 13 may include an analog/digital (A/D) converter and a digital/analog (D/A) converter, and A/D conversion or D/A conversion may be applied to various signals.

The storage 14 is a storage medium which stores a program and data necessary to implement the function of the controller 13, and includes a flash memory, for example. For example, the storage 14 stores the transmission signal generated by the controller 13.

1-3. Controller

Details of the controller 13 of the displacement detection device 1 in the present preferred embodiment are described with reference to FIG. 3.

Figure 3:
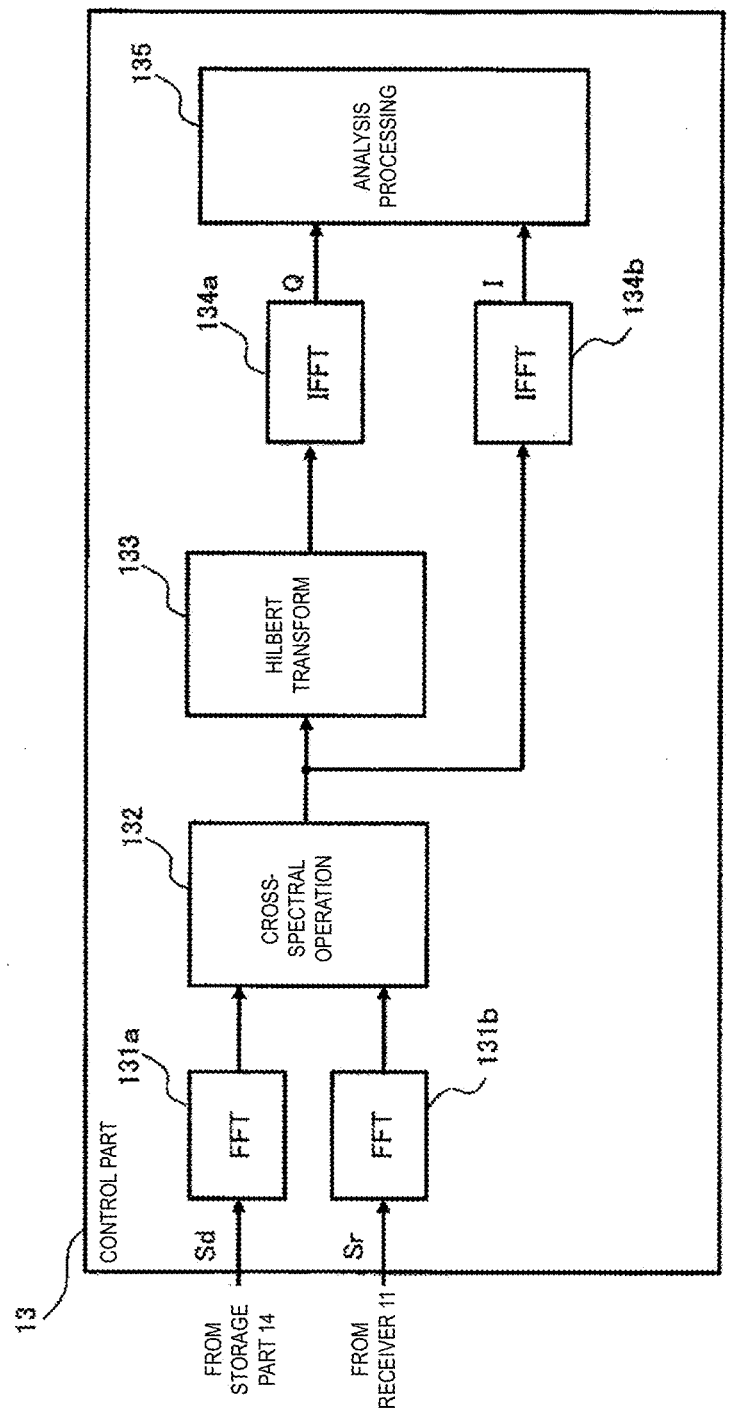
FIG. 3 is a block diagram illustrating a functional configuration of a controller of a displacement detection device according to a preferred embodiment of the present invention.

FIG. 3 is a block diagram illustrating a functional configuration of the controller 13. For example, as illustrated in FIG. 3, the controller 13 includes, as functional portions, FFT portions 131a and 131b, a cross-spectral operation portion 132, a Hilbert transform portion 133, IFFT portions 134a and 134b, and an analysis processing portion 135. The functional portions 131 to 135 provide functions of, for example, fast Fourier transform (FFT), cross-spectral operation, Hilbert transform, inverse fast Fourier transform (IFFT), and analysis processing which will be described later, respectively.

For example, the controller 13 receives inputs of a transmission signal Sd from the storage 14 and a reception signal Sr from the receiver 11, and executes signal processing by each of the functional portions 131 to 135. For example, each of the functional portions 131 to 135 is periodically operable at a given measurement frame rate (for example, 30 frames per second) as will be described later.

Among the functional portions 131 to 135, series of processing by the FFT portion 131 to the IFFT portion 134 is executed to generate an analytic signal based on the transmission signal Sd and the reception signal Sr of each frame. The analytic signal is a complex signal including a cross-correlation function between the transmission signal Sd and the reception signal Sr, and is used to detect a displacement by the displacement detection device 1. The cross-correlation function indicates correlation between the two signals Sd and Sr in a time domain.

The FFT portion 131a performs the fast Fourier transform regarding the transmission signal Sd inputted into the controller 13, and outputs, to the cross-spectral operation portion 132, a transform result of conversion from a time domain to a frequency domain. The FFT portion 131b performs the fast Fourier transform regarding the reception signal Sr inputted into the controller 13 similarly to regarding the transmission signal Sd, and outputs, to the cross-spectral operation portion 132, a transform result.

The cross-spectral operation portion 132 calculates the cross-spectrum based on the Fourier transform result of each of the signals Sd and Sr by the FFT portion 131, and outputs the calculated cross-spectrum to the Hilbert transform portion 133 and the IFFT portion 134b. The cross-spectrum corresponds to the Fourier transform of the cross-correlation function of the transmission signal Sd and the reception signal Sr, and the cross-correlation function can be obtained by inverse Fourier transform being applied to the cross-spectrum.

The Hilbert transform portion 133 performs the Hilbert transform of the cross-spectrum obtained by the cross-spectral operation portion 132, and outputs, to the IFFT portion 134a, a transform result of each frequency component of the cross-spectrum being shifted by $\pi/2$.

The IFFT portion 134a performs inverse fast Fourier transform regarding the cross-spectrum to which the Hilbert transform is applied, and outputs, to the analysis processing portion 135, a transform result of conversion from the frequency domain to the time domain. The IFFT portion 134b performs inverse fast Fourier transform regarding the cross-spectrum obtained by the cross-spectral operation portion 132, and outputs, to the analysis processing portion 135, a transform result.

By the arithmetic processing as described above, as a transform result by the IFFT portion 134b, a signal I indicating the cross-correlation function between the transmission and reception signals Sd and Sr is outputted, and as a transform result by the IFFT portion 134a, a signal Q having quadrature relation with respect to the signal I is outputted.

The analysis processing portion 135 generates an analytic signal including the signals I and Q as a real portion and an imaginary portion, respectively, and executes processing related to the analytic signal. The analytic signal generated based on the transmission signal Sd and the reception signal Sd indicates an analytic function in a complex domain. The signals I and Q are respectively referred to below as an in-phase component I and a quadrature component Q of the analytic signal.

Each function of the controller 13 as described above may be provided, for example, by the program stored in the storage 14, or a portion or an entirety of the function may be provided by a hardware circuit. Moreover, in the controller 13, the cross-correlation function may be calculated by, for example, multiply-accumulate operation directly from the transmission and reception signals Sd and Sr, instead of the processing of executing the inverse Fourier transform after the cross-spectral operation following the Fourier transform. For example, the controller 13 may include a circuit such as an FPGA which executes the multiply-accumulate operation. Furthermore, generation of the analytic signal in the controller 13 is not limited to being achieved by the Hilbert transform, and may be achieved by a function of quadrature detection, for example.

2. Operation

Operation of the displacement detection device 1 having the configuration as described above is described below.
2-1. Outline of Operation An outline of operation of the displacement detection device 1 in the present preferred embodiment to detect a displacement of the object 3 is described with reference to FIGS. 1, 4, and 5.

For example, as illustrated in FIG. 1, assuming that operation of transmitting a chirp wave one time from the transmitter 10 to the object 3 and receiving an echo of the chirp wave by the receiver 11 is a measuring operation of one frame, the displacement detection device 1 of the present preferred embodiment sequentially executes the measuring operations of the respective frames. In the displacement detection device 1, the controller 13 generates the analytic signal so as to analyze correlation between the transmission signal and the reception signal for each measurement frame.

Figure 4:
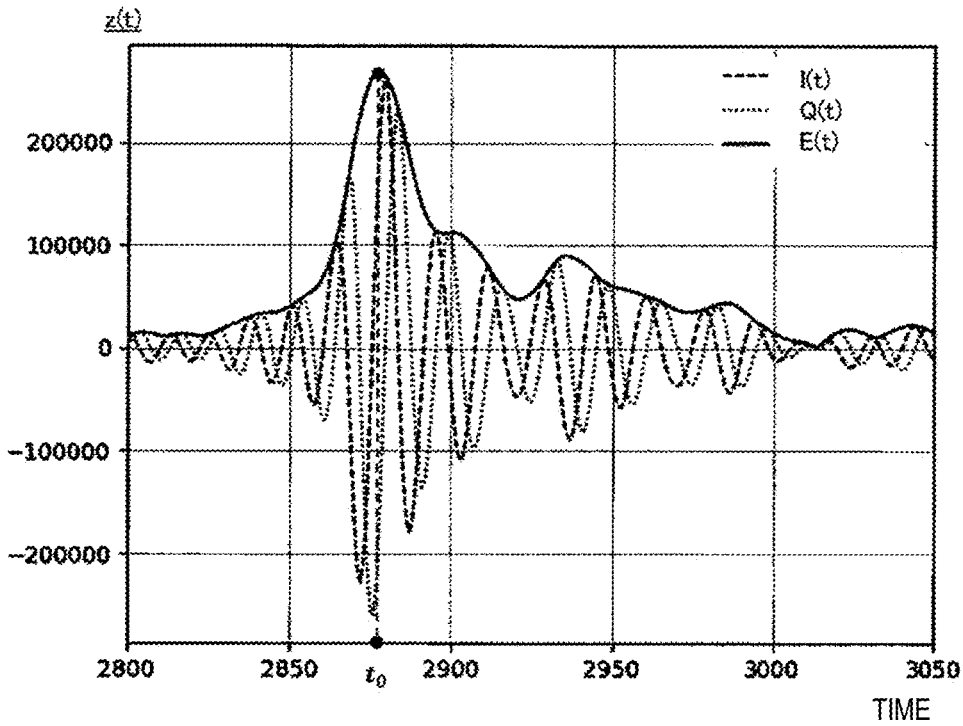
FIG. 4 is a graph illustrating an analytic signal in the displacement detection device according to a preferred embodiment of the present invention.

FIG. 4 is a graph illustrating an analytic signal z(t) in the displacement detection device 1. In FIG. 4, the analytic signal z(t) of one frame is exemplified. The analytic signal z(t) includes, as a real portion, an in-phase component I(t) indicating the cross-correlation function between the transmission signal and the reception signal, and includes, as an imaginary portion, a corresponding quadrature component Q(t). Therefore, the analytic signal z(t) is complexified and has a range of the complex number.

For example, the displacement detection device 1 calculates an envelope E(t)=|z(t)| of the analytic signal z(t), and detects a peak time $t_0$. The peak time $t_0$ is a timing at which an amplitude |z(t)| in the analytic signal z(t) of one frame becomes the largest, and is considered as a timing corresponding to a reflection timing at the object 3 during the transmission and reception of the chirp wave of the frame.

Here, conventionally, a method of measuring a displacement amount by analyzing only the envelope E(t) of the analytic signal z(t) is proposed. In this measuring method, the peak time of the envelope E(t) is detected for each frame, and the peak times of two successive frames are compared to each other, so that the displacement amount is measured. However, in this measuring method, a situation is conceivable in which a minute displacement is difficult to accurately be detected as a result of the resolution to detect the peak time based on the envelope E(t) being a measurement limit of the displacement amount or a result of influence of noise in the envelope E(t).

Figures 5A, 5B:
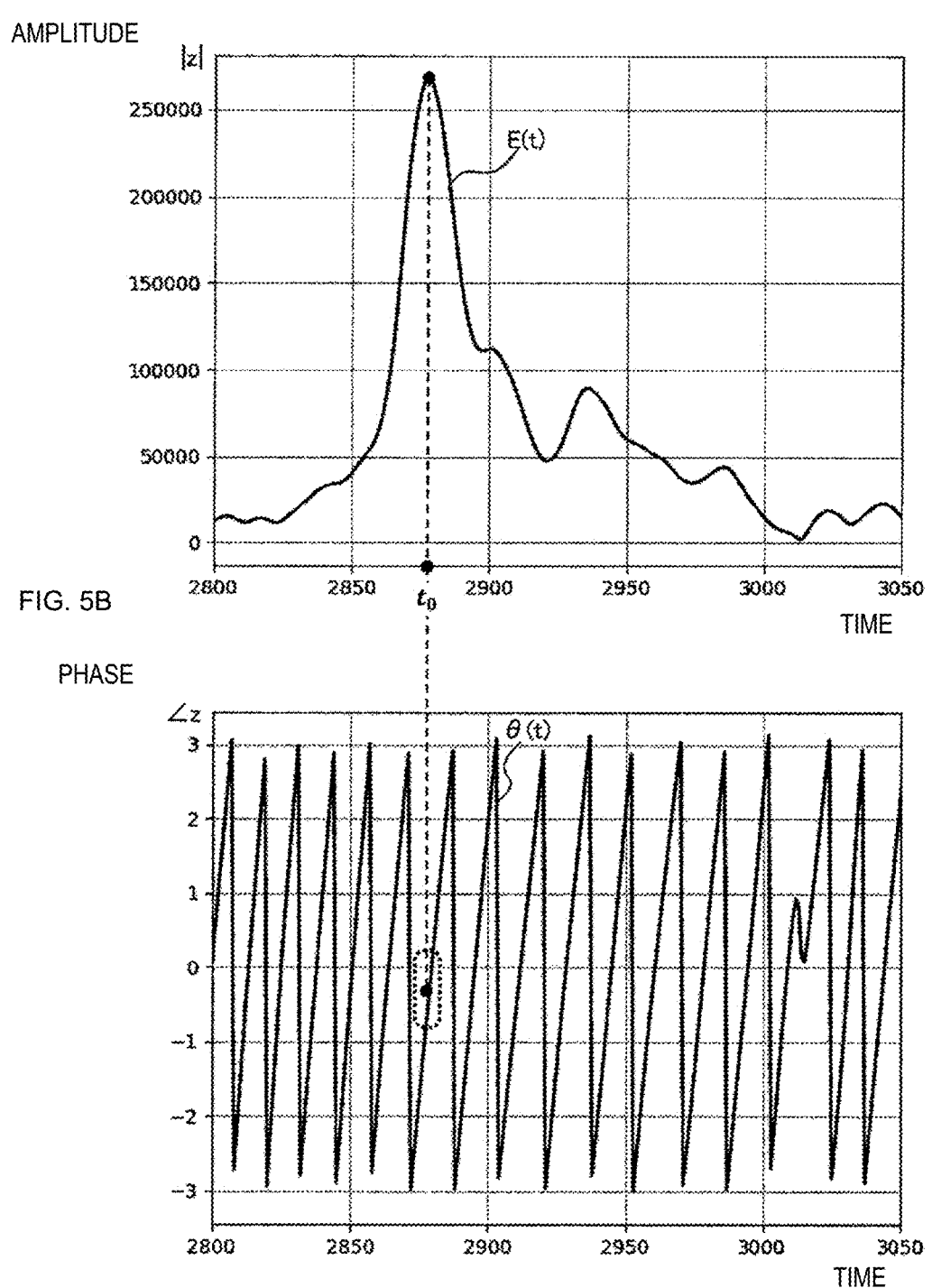
FIGS. 5A and 5B are graphs exemplifying an envelope and a phase curve of the analytic signal illustrated in FIG. 4.

In this respect, the displacement detection device 1 of the present preferred embodiment analyzes a phase ∠z(t) which is information not included in the envelope E(t), in the analytic signal z(t) obtained by complexification of the cross-correlation function. FIG. 5A exemplifies the envelope E(t) of the analytic signal z(t) illustrated in FIG. 4. FIG. 5B exemplifies a phase curve θ(t) of the analytic signal z(t) illustrated in FIG. 4.

The phase curve θ(t) indicates correspondence between the phase ∠z(t) defined in the range of the complex number in the analytic signal z(t) and a time t. The phase curve θ(t) exemplified in FIG. 5B has a steep slope in a sawtooth-shaped graph linking with vibration in the envelope E(t) illustrated in FIG. 5A. The slope of the phase curve θ(t) is defined by a frequency at each time t in the analytic signal z(t) (that is, an instantaneous frequency).

In the phase curve θ(t) of the analytic signal z(t) for each frame, a phase ∠z($t_0$) at the peak time $t_0$ of the frame is theoretically a zero value, and is considered to have an offset value depending on various noises in practice. Moreover, in the phase curve θ(t), linearity is theoretically considered to be comparatively high at the vicinity of the peak time $t_0$ of the envelope E(t).

For example, the displacement detection device 1 of the present preferred embodiment calculates a phase difference between two successive frames using the peak time $t_0$ of one of the two frames as a reference time, and measures the displacement amount of the object 3 by conversion from the phase difference. Therefore, a displacement of the object 3 can be detected highly accurately to an extent smaller than the resolution described above, for example. For example, in such conversion from the phase difference, a minute displacement amount can be calculated depending on steepness of the slope of the phase curve θ(t).
2-2. Detail of Operation Details of operation of the displacement detection device 1 in the present preferred embodiment are described with reference to FIGS. 3 to 12.

Figure 6:
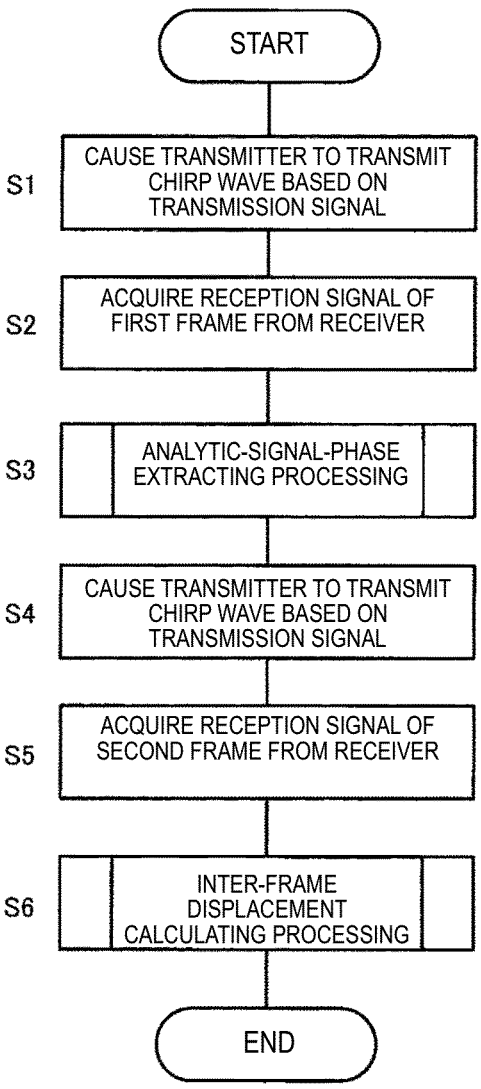
FIG. 6 is a flowchart exemplifying operation of a displacement detection device according to a preferred embodiment of the present invention.
Figures 7A, 7B:
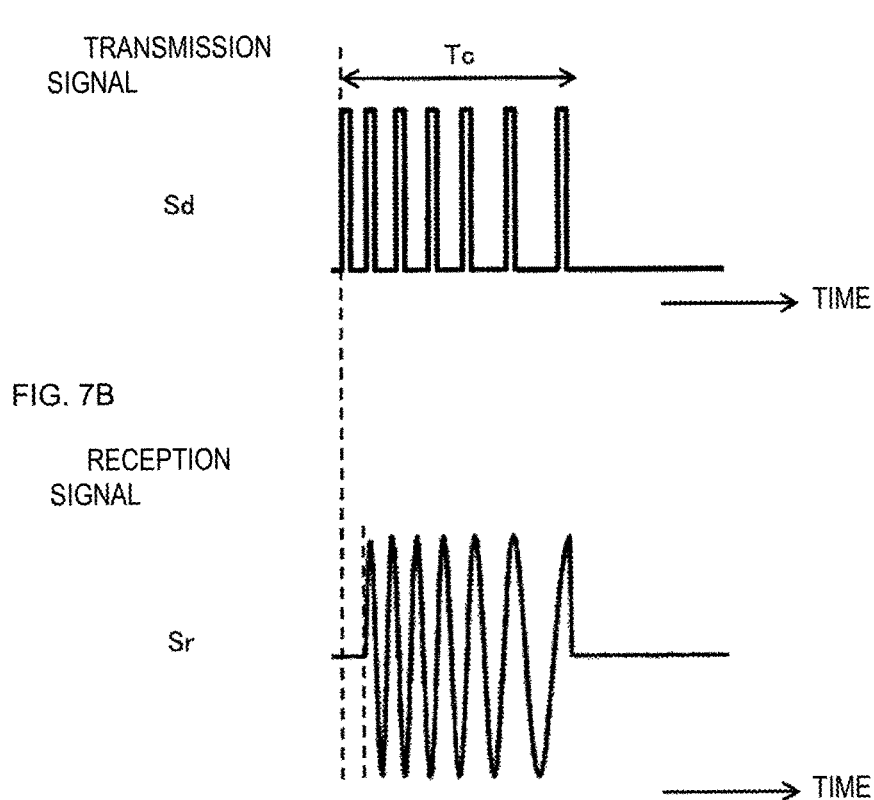
FIGS. 7A and 7B are diagrams exemplifying a transmission signal and a reception signal in a displacement detection device according to a preferred embodiment of the present invention.
Figures 8A, 8B:
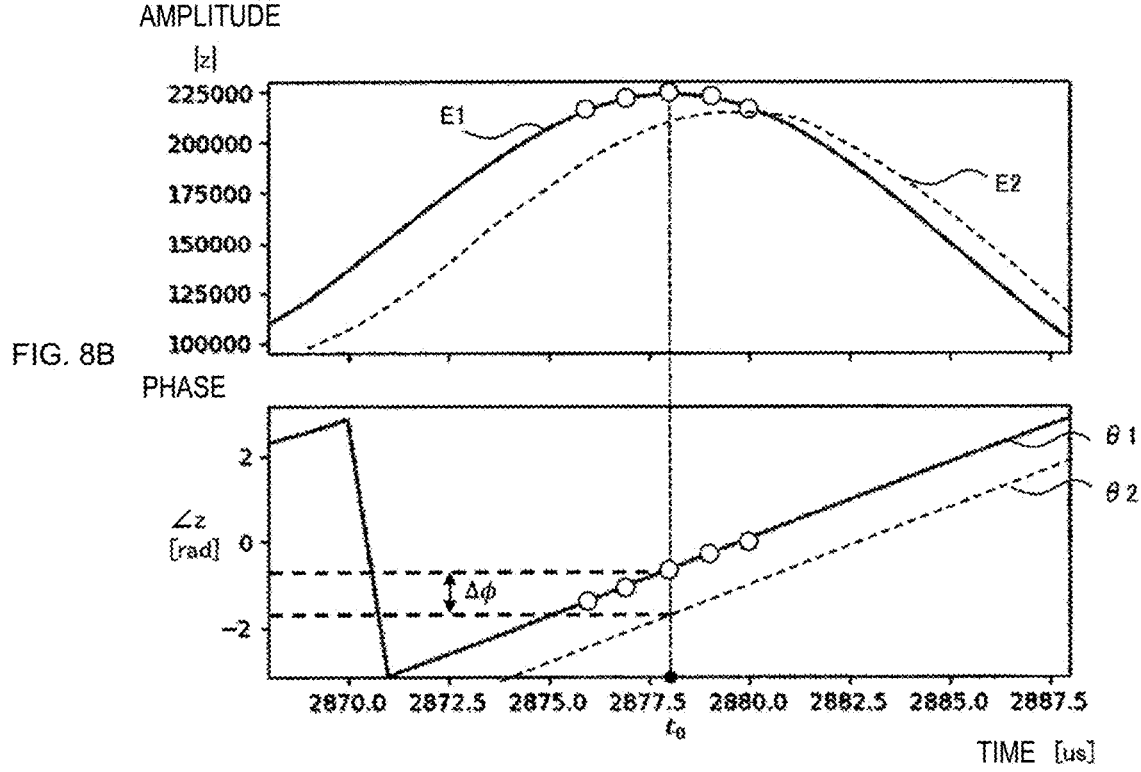
FIGS. 8A and 8B are diagrams illustrating the operation of a displacement detection device according to a preferred embodiment of the present invention.

FIG. 6 is a flowchart exemplifying the operation of the displacement detection device 1. FIGS. 7A and 7B are diagram exemplifying the transmission signal Sd and the reception signal Sr in the displacement detection device 1. FIGS. 8A and 8B are diagrams illustrating the operation of the displacement detection device 1. Each processing indicated in the flowchart in FIG. 6 is repeatedly executed at a given period (for example, every two frames) by the controller 13 of the displacement detection device 1.

FIG. 7A exemplifies the transmission signal Sd to generate the chirp wave to be transmitted from the transmitter 10. FIG. 7B exemplifies the reception signal Sr of the receiver 11 in response to FIG. 7A. FIG. 8A exemplifies envelopes E1 and E2 of the analytic signals z(t) of a first frame and a second frame, respectively. FIG. 8B exemplifies phase curves θ1 and θ2 of the analytic signals z(t) of the first frame and the second frame, respectively. In FIGS. 8A and 8B, among sampling points in the analytic signal z(t), five points at the vicinity of the peak time $t_0$ are illustrated in envelope E1 and the phase curve θ1 of the first frame. Each sampling point indicates a signal value z($t_i$) at a corresponding time $t_i$ in the analytic signal z(t) generated as a discrete signal.

In the flowchart in FIG. 6, first, the controller 13 of the displacement detection device 1 outputs the transmission signal Sd to the transmitter 10 and controls the transmitter 10 to transmit the chirp wave based on the transmission signal Sd (S1). Based on the transmission signal Sd illustrated in FIG. 7A, the chirp wave whose frequency changes with time over a chirp length Tc is transmitted from the transmitter 10. The chirp length Tc is set to a period shorter than a time interval between frames.

The displacement detection device 1 of the present preferred embodiment uses, as the transmission signal Sd, a chirp signal applied with pulse interval modulation. The pulse interval modulation changes intervals between successive pulses with time as exemplified in FIG. 7A. In the transmitter 10 including the thermophone in the present preferred embodiment, power consumption by the drive circuit is large while each pulse is in an ON state. The pulse interval modulation can reduce or prevent the power consumption in the transmitter 10.

Although in the example in FIG. 7A the transmission signal Sd is a down-chirp signal in which a frequency decreases with time, the transmission signal Sd may be an up-chirp signal in which a frequency increases with time. By such a chirp wave, for example, attenuation during propagation in the air is reduced or prevented and a displacement can accurately be detected when compared to a case where an ultrasonic wave at a single high frequency is used as described in H. Kanai, M. Sato, Y. Koiwa and N. Chubachi, "Transcutaneous measurement and spectrum analysis of heart wall vibrations," in IEEE Transactions on Ultrasonics, Ferroelectrics, and Frequency Control, vol. 43, no. 5, pp. 791-810, September 1996, doi: 10.1109/58.535480.

Returning back to FIG. 6, after the transmission of the chirp wave (S1), the controller 13 acquires, from the receiver 11, the reception signal Sr indicating the reception result of the first frame (S2). The reception result of the first frame indicates an echo in response to the chirp wave transmitted at Step S1. In FIG. 7B, the reception signal Sr which is delayed from rising of the successive pulses illustrated in FIG. 7A in accordance with a time lag from the transmission of the chirp wave to the reception of the echo (that is, a propagation period of the chirp wave) is received.

Next, the controller 13 generates the analytic signal z(t) by calculating the cross-correlation function between the transmission signal Sd and the reception signal Sr of the first frame based on the signals Sd and Sr, and executes processing to extract phase information in the analytic signal z(t) (S3). In such analytic-signal-phase extracting processing (S3), for example, the controller 13 executes, as each of the functional portions 131 to 135 illustrated in FIG. 3, generation and processing of the analytic signal z(t) based on the transmission signal Sd stored in the storage 14 and the reception signal Sr acquired at Step S2.

A cross-correlation function $c(\tau)$ between the signals Sd and Sr is represented by the following formula.

[Math. 1]

$$c(\tau) = \lim_{T \to \infty} \frac{1}{T} \int_{-\frac{T}{2}}^{\frac{T}{2}} s_d(t) s_r(t + \tau) dt$$

Here, T indicates a period for one frame, and $\tau$ indicates a delay time. The cross-correlation function $c(\tau)$ indicates a correlation when the two signals Sd and Sr has the delay time $\tau$.

The controller 13 functions as, for example, the FFT portion 131, the cross-spectral operation portion 132, and the IFFT portion 134b illustrated in FIG. 3, and performs the inverse Fourier transform from the cross-spectrum between the signals Sd and Sr, thus outputting the in-phase component I(t) indicating the cross-correlation function $c(\tau)$. Moreover, the controller 13 functions as the FFT portion 131, the cross-spectral operation portion 132, the Hilbert transform portion 133, and the IFFT portion 134a, and performs the inverse Fourier transform from the Hilbert transform of the cross-spectrum, thus outputting the quadrature component Q(t) indicating the Hilbert transform of the cross-correlation function $c(\tau)$. Therefore, the analytic signal z(t)=I(t)+jQ(t) is obtained based on the components I(t) and Q(t) (j is an imaginary unit).

In the analytic-signal-phase extracting processing (S3), the controller 13 detects the peak time $t_0$ from the envelope E(t) of the analytic signal z(t), and extracts, from the phase $\angle z(t)$, the phase information including the phase $\angle z(t_0)$ at the peak time $t_0$. FIGS. 8A and 8B are enlarged graphs of the vicinity of the peak time $t_0$ corresponding to FIGS. 5A and 5B. In the example in FIG. 8A, the peak time $t_0$ is detected in the envelope E1 of the first frame. The phase information is extracted from the phase $\angle z(t)$ on the phase curve $\theta 1$ of the first frame illustrated in FIG. 8B using the peak time $t_0$ as the reference time. Details of the analytic-signal-phase extracting processing (S3) will be described later.

Next, similarly to Steps S1 and S2, the controller 13 executes transmission and reception of a chirp wave for the second time, and receives the reception signal Sr corresponding to the transmission signal Sd of the second frame (S4 and S5).

The controller 13 uses the phase information of the first frame and phase information of the analytic signal z(t) generated based on the transmission and reception signals Sd and Sr of the second frame, to execute processing to calculate a displacement amount $\Delta x$ of the object 3 in accordance with a difference in the phase information between the two frames (S6). In such inter-frame displacement calculating processing (S6), the controller 13 generates, as each of the functional portions 131 to 135 illustrated in FIG. 3, for example, the analytic signal z(t) of the second frame, and extracts the phase information of the second frame.

In the inter-frame displacement calculating processing (S6), the controller 13 functions as the analysis processing portion 135 illustrated in FIG. 3, for example, and calculates a difference between the phase information of the respective frames. First, the controller 13 extracts the phase information of the second frame from the phase $\angle z(t)$ on the phase curve $\theta 2$ of the second frame illustrated in FIG. 8B using the peak time $t_0$ of the first frame as the reference time, for example. Next, the controller 13 calculates a phase difference $\Delta \varphi$ between the frames at the peak time $t_0$ based on the difference between the phase information of the respective frames. The controller 13 calculates the inter-frame displacement amount $\Delta x$ by conversion from such a peak phase difference $\Delta \varphi$.

The inter-frame displacement amount $\Delta x$ is represented by the following formula (1).

[Math. 2]

$$\Delta x = \frac{c}{2} \frac{\Delta \varphi}{2 \pi f_c} \quad (1)$$

Here, c indicates an acoustic velocity, $\pi$ indicates a ratio of a circle's circumference, and $f_c$ indicates a center frequency of the analytic signal z(t). In the inter-frame displacement calculating processing (S6) in the present preferred embodiment, $f_c$ is determined by the analytic signal z(t) of the first frame, and is calculated as a slope of the phase $\angle z(t_0)$ at the peak time $t_0$ (that is, the instantaneous frequency). Details of the inter-frame displacement calculating processing (S6) will be described later.

In the processing as described above, the displacement detection device 1 extracts the phase information of the analytic signal z(t) (S3) attributed to the transmission and reception of the chirp wave for the first time (S1 and S2), and calculates the displacement amount $\Delta x$ (S6) which is obtained through conversion from the peak phase difference $\Delta \varphi$ comparing to the analytic signal z(t) attributed to the transmission and reception for the second time (S4 and S5). Therefore, for example, detection error due to, for example, attenuation of the reception signal Sr in air and superimposition of noise can be reduced, and a minute displacement of the object 3 can be accurately detected even without contacting the object 3. Moreover, since detection is possible without contacting the object 3 by such a displacement detection device 1, detection of a minute displacement can be facilitated.

In terms of displacement detection, conventionally, a method is known in which a distance to the object 3 is estimated twice based on a shift of the peak time of the analytic signal z(t) and a difference between the distances in the respective times is calculated as the displacement amount $\Delta x$. In such a method in which the distance is estimated based on the peak time, in detection of a minute displacement, detecting a displacement is difficult, when the shift of the peak time is smaller than a time interval of the sampling points (that is, a sampling rate) in the analytic signal z(t) as illustrated in FIG. 8A, for example. On the other hand, even in such a case, the displacement detection device 1 of the present preferred embodiment can accurately detect a minute displacement by converting the peak phase difference $\varphi\Delta$ obtained by transmission and reception of the chirp waves into the displacement amount $\Delta x$.

Moreover, in the above-described conventional method in which the distance is estimated, variation in a propagation period of a sound wave due to an air current or the like causes a decrease in estimation accuracy. In this respect, the displacement detection device 1 of the present preferred embodiment directly calculates the displacement amount $\Delta x$ in a short period such as between frames without estimation of the distance. Therefore, a displacement can accurately be detected also from a perspective of reducing or preventing an influence of an air current or the like to the propagation period, for example.

In the inter-frame displacement calculating processing (S6) described above, the example is described in which, regarding the analytic signal z(t) of the second frame, only the phase information is used. Alternatively, for example, the displacement detection device 1 may detect the peak time also regarding the analytic signal z(t) of the second frame and use the detected peak time together with the peak time $t_0$ of the first frame to calculate the displacement amount $\Delta x$, and may also use it in the analytic-signal-phase extracting processing (S3) in the next execution period. Furthermore, in the inter-frame displacement calculating processing (S6), the peak phase difference may be calculated using the peak time of the second frame as the reference time. For example, the displacement detection device 1 may detect the peak time in the analytic signal z(t) of the second frame, instead of that of the first frame.

Moreover, although the example in which the processing indicated in FIG. 6 is executed at a period of every two frames is described above, it may be executed at a period different from the above-described example. For example, the processing indicated in FIG. 6 may be executed every one frame, and the transmission and reception signals Sd and Sr in the transmission and reception of the chirp wave for the second time (S4 and S5) may be held and, in the next execution period, the processing may be started from the analytic-signal-phase extracting processing (S3) based on the held signals Sd and Sr.

2-2-1. Analytic-Signal-Phase Extracting Processing

Details of the analytic-signal-phase extracting processing at Step S3 in FIG. 6 are described with reference to FIGS. 9 and 10A and 10B.

Figure 9:
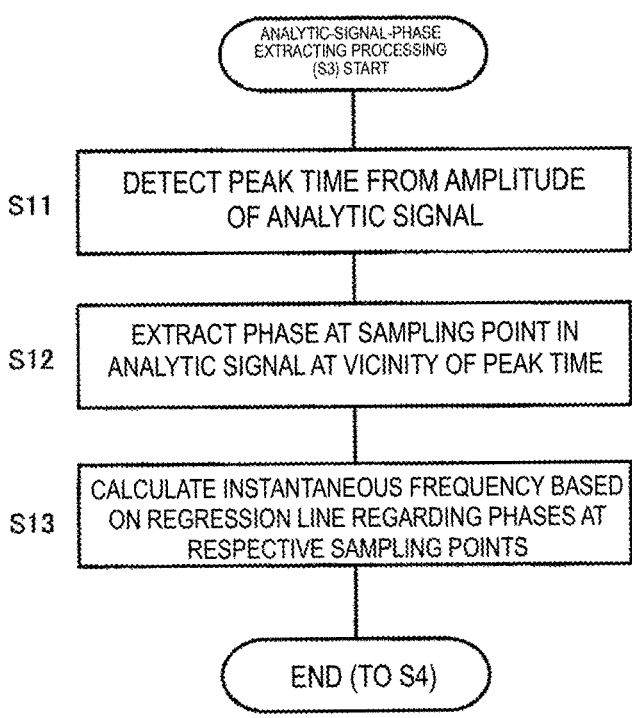
FIG. 9 is a flowchart exemplifying analytic-signal-phase extracting processing in a displacement detection device according to a preferred embodiment of the present invention.
Figures 10A, 10B:
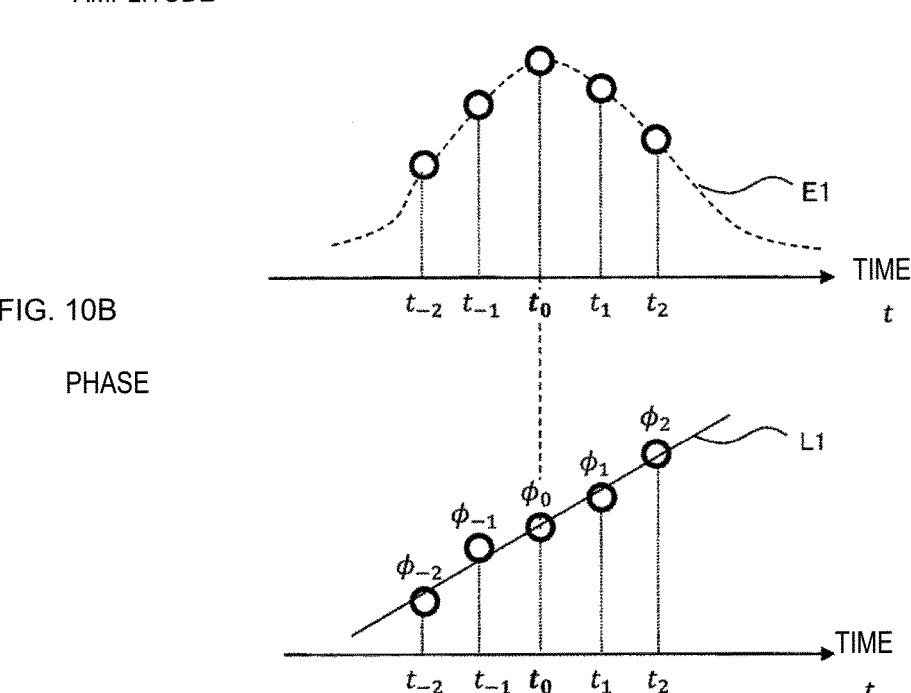
FIGS. 10A and 10B are diagrams illustrating the analytic-signal-phase extracting processing.

FIG. 9 is a flowchart exemplifying the analytic-signal-phase extracting processing (S3) in the displacement detection device 1 of the present preferred embodiment. FIGS.

10A and 10B are diagrams illustrating the analytic-signal-phase extracting processing (S3). FIGS. 10A and 10B illustrate the amplitude |z(t)| and the phase $\angle z(t)$ of the analytic signal z(t), respectively, in a time domain at the vicinity of the peak time $t_0$.

The processing indicated in the flowchart in FIG. 9 is started in the state where, for example, the transmission signal Sd and the reception signal Sr of the first frame at Steps S1 and S2 in FIG. 6 are held.

First, the controller 13 of the displacement detection device 1 detects the peak time $t_0$ in the amplitude |z(t)| of the analytic signal z(t) obtained based on the transmission signal Sd and the reception signal Sr (S11). The controller 13 calculates, as the FFT portion 131 to the IFFT portion 134 illustrated in FIG. 3, for example, the in-phase component I and the quadrature component Q based on the transmission signal Sd and the reception signal Sr. The controller 13 calculates, as the analysis processing portion 135 illustrated in FIG. 3, for example, the envelope E(t)=|z(t)| by a root of the sum of squares of the in-phase component I and the quadrature component Q. The controller 13 detects the time at which the amplitude |z(t)| becomes the largest as the peak time $t_0$=argmax|z(t)|, based on the envelope E(t).

Next, the controller 13 specifies a given number of (for example, five) sampling points in the analytic signal z(t) at the vicinity of the peak time $t_0$, and extracts the phase $\angle z(t)$ at each sampling point as the phase information (S12). In the example in FIG. 10A, five points in the analytic signal are specified as the sampling points, at sampling times $t_{-2}$, $t_{-1}$, $t_1$, and $t_2$ which are positioned with two in each of the front and behind the peak time to positioned at the middle. In FIG. 10B, phases $\varphi_{-2}$, $\varphi_{-1}$, $\varphi_0$, $\varphi_1$, and $\varphi_2$ of the analytic signal z(t) at the sampling times $t_{-2}$ to $t_2$ are extracted as the phases $\angle z(t)$ at the respective sampling points specified in FIG. 10A.

The phase $\varphi_i=\angle z(t_i)$ of the analytic signal at the time $t_i$ is represented by the following formula using the in-phase component $I(t_i)$ and the quadrature component $Q(t_i)$ at the time $t_i$.

$$\angle z(t_i)=\arctan(Q(t_i)/I(t_i))$$

The controller 13 holds, in the storage 14, for example, the sampling times $t_{-2}$ to $t_2$ at the vicinity of the peak time $t_0$ and the phases $\varphi_{-2}$ to $\varphi_2$ at the extracted sampling points.

The controller 13 calculates, for example, by the least squares method, a slope of a regression line (that is, a regression coefficient) regarding the phases $\varphi_{-2}$ to $\varphi_2$ at the extracted sampling points, as the instantaneous frequency fc corresponding to the center frequency of the analytic signal z(t) (S13). In the example in FIG. 10B, a slope of a regression line L1 regarding the phases $\varphi_{-2}$ to $\varphi_2$ is calculated as the instantaneous frequency fc.

For example, the controller 13 holds the calculated instantaneous frequency fc in the storage 14, and ends the analytic-signal-phase extracting processing (S3). Then, the processing proceeds to Step S4 in FIG. 6.

In the analytic-signal-phase extracting processing (S3) described above, after the peak time $t_0$ in the amplitude |z(t)| of the analytic signal z(t) is detected (S11), the phases $\varphi_{-2}$ to $\varphi_2$ at the sampling points at the vicinity of the peak time $t_0$ are extracted (S12). Then, the instantaneous frequency fc of the analytic signal z(t) is calculated based on the regression line L1 regarding the extracted phases of the respective sampling points (S13). In this manner, in the analytic signal z(t), the instantaneous frequency fc can accurately be calculated by using the phases $\varphi_{-2}$ to $\varphi_2$ at the plurality of sampling points, and the inter-frame displacement calculating processing (S6) can be executed.

In the analytic-signal-phase extracting processing (S3) described above, the example is described in which five sampling points at the vicinity of the peak are specified and are used for extraction of the phase $\angle z(t)$. The number of sampling points at the vicinity of the peak is not limited to five, but may be three including, for example, the peak time $t_0$ and sampling times one in each of front and behind the peak time $t_0$.

2-2-2. Inter-Frame Displacement Calculating Processing

Figure 12:
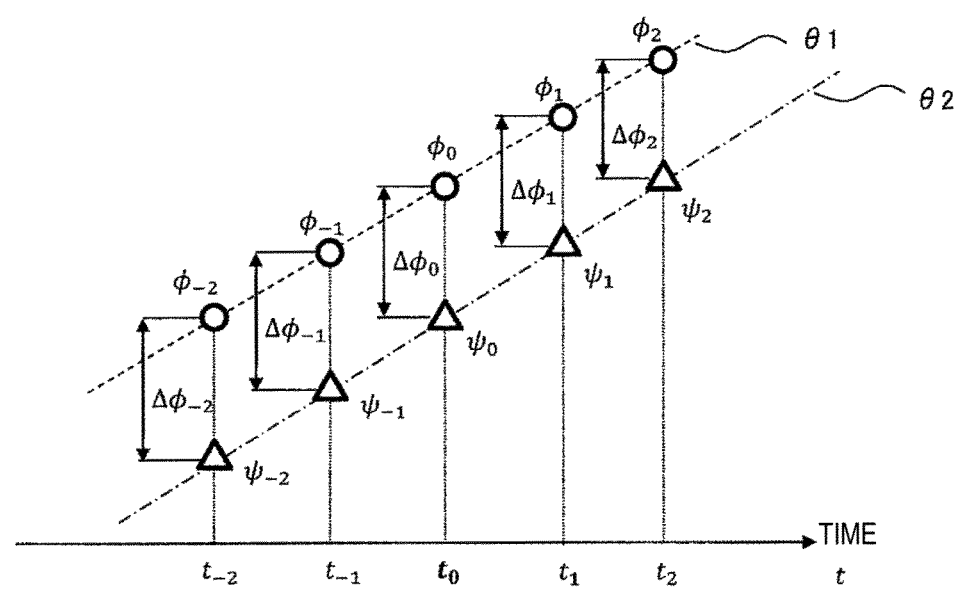
FIG. 12 is a diagram illustrating the inter-frame displacement calculating processing.

Details of the inter-frame displacement calculating processing at Step S6 in FIG. 6 are described with reference to FIGS. 11 and 12.

FIG. 11 is a flowchart exemplifying the inter-frame displacement calculating processing (S6) in the displacement detection device 1 of the present preferred embodiment. FIG. 12 is a diagram illustrating the inter-frame displacement calculating processing (S6). FIG. 12 illustrates the phase curves θ1 and θ2 of the analytic signals z(t) of the first frame and the second frame, respectively.

For example, each processing indicated in the flowchart in FIG. 11 is started in the state where the phases $\varphi_{-2}$ to $\varphi_2$ and the sampling times $t_{-2}$ to $t_2$ at the vicinity of the peak of the analytic signal z(t) of the first frame and the transmission and reception signals Sd and Sr of the second frame acquired at Steps S3 to S5 in FIG. 6 are held.

First, the controller 13 calculates, in the analytic signal z(t) obtained based on the transmission and reception signals Sd and Sr of the second frame, for example, phases at the respective sampling times $t_{-2}$ to $t_2$ at the vicinity of the peak time $t_0$ of the first frame, as the phase information of the second frame (S21). For example, the controller 13 generates the analytic signal z(t) of the second frame similarly to the generation of the analytic signal z(t) of the first frame in the analytic-signal-phase extracting processing (S3). In the example in FIG. 12, in the generated analytic signal z(t) of the second frame, phases $\psi_{-2}$, $\psi_{-1}$, $\psi_0$, $\psi_1$, and $\psi_2$ at the respective sampling times $t_{-2}$ to $t_2$ in the phase $\angle z(t)$ on the phase curve θ2 are calculated.

Next, the controller 13 calculates the phase difference between the frames at each of the sampling times $t_{-2}$ to $t_2$ (S22). In FIG. 12, differences between the phases $\varphi_{-2}$ to $\varphi_2$ of the first frame and the phases $\varphi_{-2}$ to $\varphi_2$ of the second frame are calculated as phase differences $\Delta\varphi_{-2}$, $\Delta\varphi_{-1}$, $\Delta\varphi_0$, $\Delta\varphi_1$, and $\Delta\varphi_2$ for the respective sampling times $t_{-2}$ to $t_2$.

The controller 13 calculates an average of the phase differences $\Delta\varphi_{-2}$ to $\Delta\varphi_2$ between the first frame and the second frame at the respective sampling times $t_{-2}$ to $t_2$, as the peak phase difference $\Delta\varphi$ between the frames (S23).

The controller 13 calculates the inter-frame displacement amount $\Delta x$ based on the peak phase difference $\Delta\varphi$ by the conversion indicated by the above-described formula (1), for example, using the instantaneous frequency fc of the first frame (S24).

In the inter-frame displacement calculating processing (S6) described above, the peak phase difference $\Delta\varphi$ is calculated based on the phase differences $\Delta\varphi_{-2}$ to $\Delta\varphi_2$ comparing to the second frame at the sampling times $t_{-2}$ to $t_2$ at the vicinity of the peak of the first frame (S21 to S23), and the inter-frame displacement amount $\Delta x$ is calculated depending on the peak phase difference $\Delta\varphi$ (S24). Therefore, the peak phase difference $\Delta\varphi$ is estimated using the phase differences $\Delta\varphi_{-2}$ to $\Delta\varphi_2$ at the plurality of sampling points, and a displacement can accurately be detected based on the peak phase difference $\Delta\varphi$.

In the inter-frame displacement calculating processing (S6) described above, the example is described in which the average of the phase differences $\Delta\varphi_{-2}$ to $\Delta\varphi_2$ at the respective sampling times $t_{-2}$ to $t_2$ is used as the peak phase difference $\Delta\varphi$. The peak phase difference $\Delta\varphi$ is not limited to the example described above, but, for example, the phase difference $\Delta\varphi_0$ between the frames at the peak time $t_0$ of the first frame may be used. Moreover, for example, a peak time may be detected also regarding the analytic signal z(t) of the second frame by the processing the same as or similar to Step S11 of the analytic-signal-phase extracting processing (S3), and the peak phase difference $\Delta\varphi$ may be calculated based on an average obtained while being added with a phase difference at the vicinity of the peak time of the second frame. The peak phase difference $\Delta\varphi$ may be calculated based on the regression line L1 regarding the first frame exemplified in FIG. 10B and a function indicating a regression line which is operable regarding the phase $\angle z(t)$ of the second frame, similarly to the regression line L1.

At Step S24 described above, the example in which the displacement amount $\Delta x$ is calculated by using the instantaneous frequency fc of the first frame is described. At Step S24, not being limited to the instantaneous frequency fc of the first frame, but, for example, an instantaneous frequency which is calculated based on the phase $\angle z(t)$ of the analytic signal z(t) of the second frame by processing the same as or similar to Steps S11 to S13 of the analytic-signal-phase extracting processing (S3) may be used to calculate the displacement amount $\Delta x$. Moreover, an average of the instantaneous frequency fc of the first frame and the instantaneous frequency of the second frame may be used to calculate the displacement amount $\Delta x$.

3. Summary

As described above, the displacement detection device 1 of the present preferred embodiment includes the transmitter 10, the receiver 11, and the controller 13. The transmitter 10 transmits, to the object 3, a chirp wave as one example of a modulated wave including a plurality of frequencies. The receiver 11 receives a reflection wave (that is, an echo) from the object 3, and generates the reception signal Sr indicating the reception result. The controller 13 controls transmission of the chirp wave by the transmitter 10 and acquires the reception signal Sr from the receiver. The controller 13 outputs a first transmission signal Sd to the transmitter 10 to transmit the chirp wave (S1) and acquires a responsive first reception signal Sr (S2) in the first frame as one example of a first measurement period. The controller 13 extracts, based on the first transmission signal Sd and the first reception signal Sr, first phase information indicating a phase defined in a correlation between the first transmission signal Sd and the first reception signal Sr (S3). The controller 13 outputs a second transmission signal Sd to the transmitter 10 to transmit the chirp wave (S4) and acquires a responsive second reception signal Sr (S5) in the second frame as one example of a second measurement period after the first measurement period. The controller 13 extracts, based on the second transmission signal Sd and the second reception signal Sr, second phase information indicating a phase defined in a correlation between the second transmission signal Sd and the second reception signal Sr (S6). The controller 13 detects an inter-frame displacement of the object between the first frame and the second frame as one example of the first and second measurement periods, depending on a difference between the first phase information and the second phase information (S6).

The displacement detection device 1 as described above detects the displacement of the object 3 between the first and second measurement periods, depending on the difference between the first phase information and the second phase information. Therefore, a minute displacement can accurately be detected depending on, for example, steepness of the slope of the phase as illustrated in FIG. 5B.

In the present preferred embodiment, the controller 13 generates, based on the first transmission signal Sd and the first reception signal Sr, a first analytic signal z(t) including the amplitude |z(t)| and the phase $\angle z(t)$ defined in the correlation between the first transmission signal Sd and the first reception signal Sr, and extracts the phases $\varphi_{-2}$ to $\varphi_2$ of the first frame as one example of the first phase information from the first analytic signal z(t) (S3, S11, and S12). The controller 13 generates, based on the second transmission signal Sd and the second reception signal Sr, a second analytic signal z(t) including the amplitude |z(t)| and the phase $\angle z(t)$ defined in the correlation between the second transmission signal Sd and the second reception signal Sr, and extracts the phases $\psi_{-2}$ to $\psi_2$ of the second frame as one example of the second phase information from the second analytic signal z(t) (S6 and S21). Therefore, the phase information can be extracted through analysis of the phase $\angle z(t)$ separately from the amplitude |z(t)| in the analytic signal z(t).

In the present preferred embodiment, the controller 13 detects the peak time $t_0$ at which the amplitude |z(t)| of the analytic signal z(t) of the first frame becomes the largest as one example of a timing at which at least one of the amplitude of the first analytic signal and the amplitude of the second analytic signal becomes the largest (S3 and S11), and calculates the peak phase difference $\Delta\varphi$ as one example of a difference between the first phase information and the second phase information using the detected timing as a reference timing (S6 and S21 to S24). Therefore, the peak phase difference $\Delta\varphi$ can be calculated using, as the reference timing, the timing corresponding to the reflection timing at the object 3 in the transmission and reception of the chirp wave of the frame.

In the present preferred embodiment, the controller 13 measures the displacement amount $\Delta x$ indicating the displacement of the object 3, based on the peak phase difference $\Delta\varphi$ as one example of the difference between the first phase information and the second phase information, and the instantaneous frequency fc as one example of a slope of the phase $\angle z(t)$ at the peak time $t_0$ (one example of the reference timing) (S6 and S24). Therefore, the peak phase difference $\Delta\varphi$ can be converted into the displacement amount $\Delta x$ by using the instantaneous frequency fc.

In the present preferred embodiment, the controller 13 calculates the envelope E(t) of the analytic signal z(t) of the first frame, as one example of an envelope of at least one of an envelope of the first analytic signal and an envelope of the second analytic signal, and detects the peak time $t_0$ as one example of the timing at which the amplitude |z(t)| becomes the largest based on the calculated envelope E(t) (S11). Therefore, the peak time to can accurately be detected in the envelope E(t) obtained based on both of the in-phase component I and the quadrature component Q.

In the present preferred embodiment, the controller 13 calculates a cross-correlation function between the first transmission signal Sd and the first reception signal Sr to be complexified and generates the first analytic signal z(t), based on the first transmission signal Sd and the first reception signal Sr (S3). The controller 13 calculates a cross-correlation function between the second transmission signal Sd and the second reception signal Sr to be complexified and generates the second analytic signal z(t), based on the second transmission signal Sd and the second reception signal Sr (S6). Therefore, the phase $\angle z(t)$ defined in the range of the complex number of the complexified analytic signal z(t) can be calculated based on the cross-correlation function indicative of the correlation between the transmission signal Sd and the reception signal Sr in the time domain.

In the present preferred embodiment, each transmission signal Sd causes the transmitter 10 to transmit the modulated wave by the linear frequency chirp (S1 and S4). Therefore, a displacement can accurately be detected by using information obtained from different frequencies, for example.

In the present preferred embodiment, the transmitter 10 includes the thermophone which transmits, as the modulated wave, a chirp wave as one example of a sound wave including a plurality of frequencies. Therefore, the transmitter 10 can transmit a chirp wave by a wideband ultrasonic wave, for example, at about 20 kHz to about 100 kHz.

The displacement detection method of the present preferred embodiment is executed by the controller 13 which controls the transmitter 10 which transmits, to the object 3, the chirp wave including a plurality of frequencies (one example of the modulated wave), and acquires, from the receiver 11 which receives the reflection wave from the object 3, the reception signal indicating the reception result. The controller 13 outputs a first transmission signal Sd to the transmitter 10 to transmit the chirp wave (S1) and acquires a responsive first reception signal Sr (S2) in the first frame as one example of a first measurement period. The controller 13 extracts, based on the first transmission signal Sd and the first reception signal Sr, first phase information indicating a phase defined in a correlation between the first transmission signal Sd and the first reception signal Sr (S3). The controller 13 outputs a second transmission signal Sd to the transmitter 10 to transmit the chirp wave (S4) and acquires a responsive second reception signal Sr (S5) in the second frame as one example of a second measurement period after the first measurement period. The controller 13 extracts, based on the second transmission signal Sd and the second reception signal Sr, second phase information indicating a phase defined in a correlation between the second transmission signal Sd and the second reception signal Sr (S6). The controller 13 detects a displacement of the object between the first and second measurement periods, depending on the peak phase difference $\Delta\varphi$ as one example of the difference between the first phase information and the second phase information (S6).

In the present preferred embodiment, a program which causes the controller 13 to execute the displacement detection method as described above is provided. The displacement detection method and the program as described above enable accurate detection of a minute displacement of the object 3.

EXAMPLE

An example regarding the above-described preferred embodiment is described with reference to FIGS. 13A and 13B to 15.

Figure 13A:
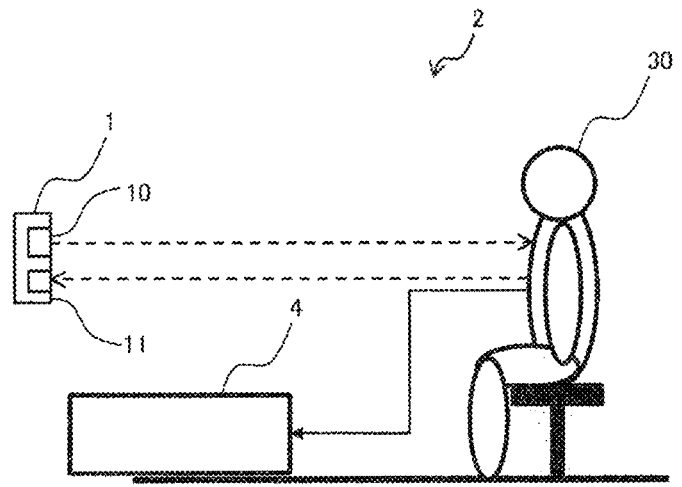
FIGS. 13A and 13B are diagrams illustrating heartbeat measurement using a displacement detection device according to a preferred embodiment of the present invention.
Figure 13B:
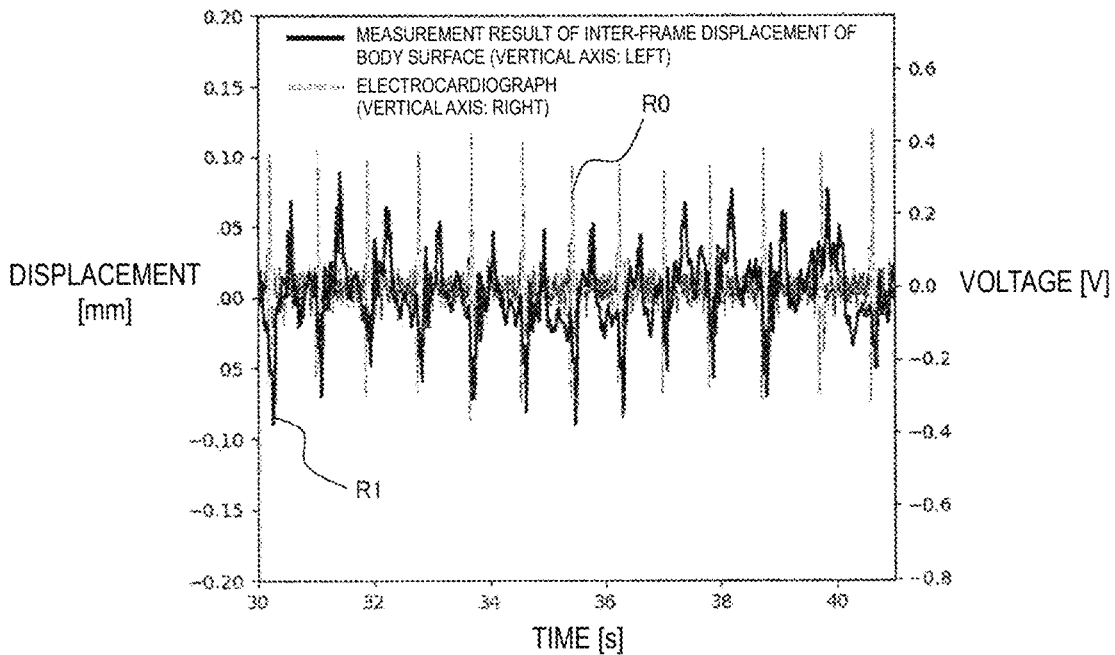
Figure 14:
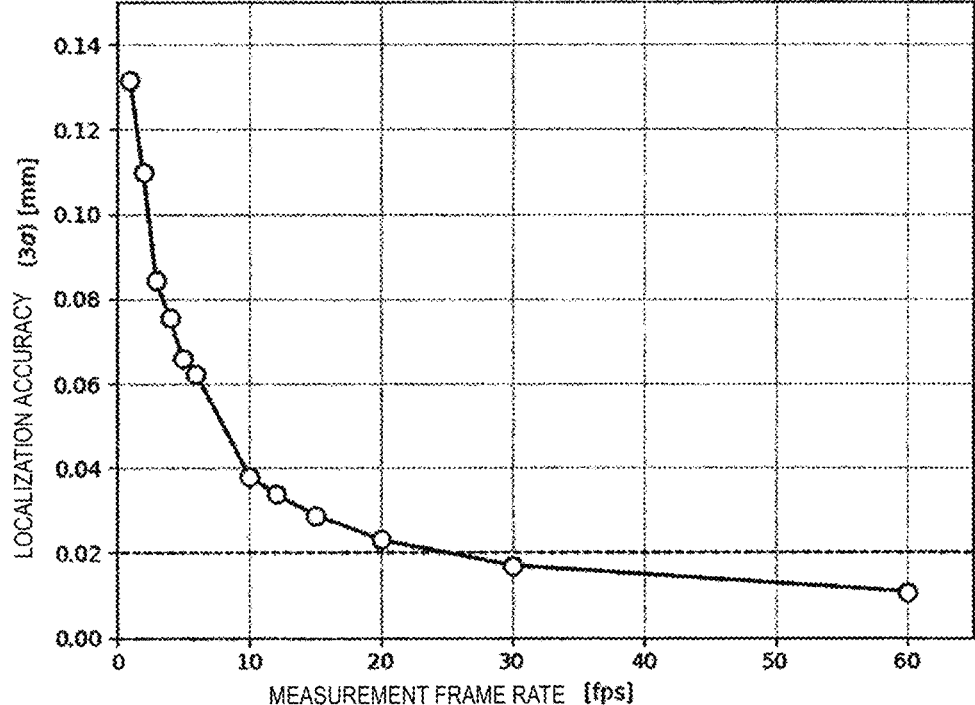
FIG. 14 is a diagram illustrating relation between a measurement frame rate and localization accuracy in a displacement detection device according to a preferred embodiment of the present invention.
Figure 15:
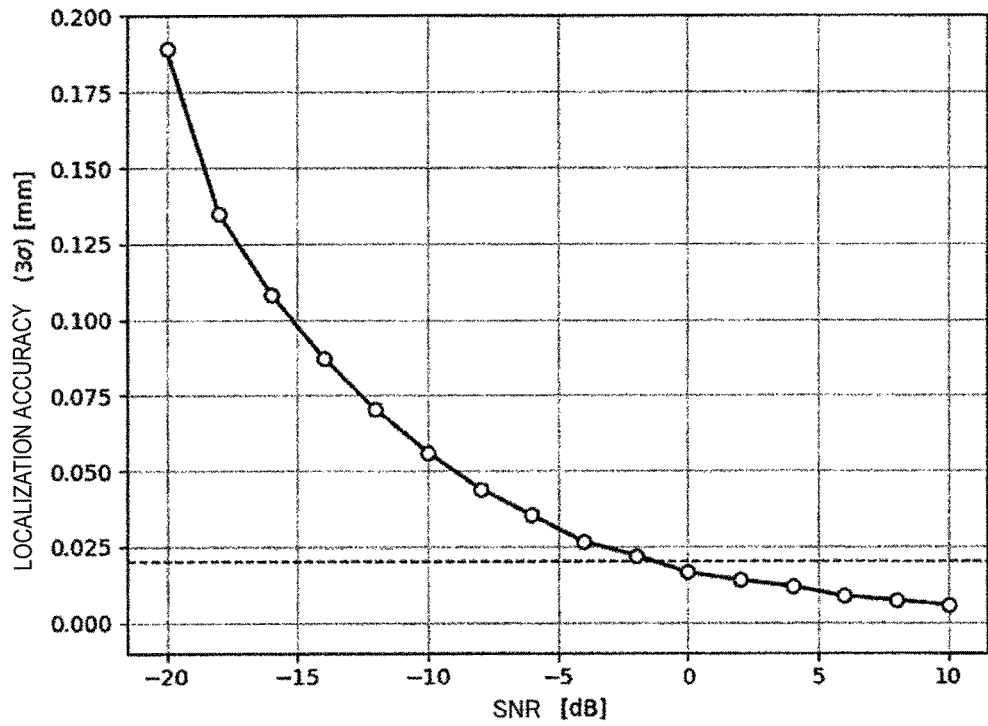
FIG. 15 is a diagram illustrating a relationship between an SNR of the reception signal and the localization accuracy in a displacement detection device according to a preferred embodiment of the present invention.

FIGS. 13A and 13B are diagrams illustrating heartbeat measurement using the displacement detection device 1 of the present preferred embodiment. FIG. 13A illustrates a configuration example of a heartbeat measurement system using the displacement detection device 1. FIG. 13B shows a measurement result by the heartbeat measurement system illustrated in FIG. 13A. FIGS. 14 and 15 show a simulation result of the operation of the displacement detection device 1.

A heartbeat measurement system 2 exemplified in FIG. 13A is used to measure, without contact, a heartbeat of a subject 30 wearing clothing, by detecting a minute displacement of a body surface attributed to the heartbeat of the subject 30, by the displacement detection device 1, for example. In the heartbeat measurement system 2 illustrated in FIG. 13A, the heartbeat of the subject 30 is measured not only by the displacement detection device 1, but also by an electrocardiograph 4 for reference.

FIG. 13B shows a displacement R1 between frames detected by the displacement detection device 1, and a heartbeat waveform R0 measured by the electrocardiograph 4. In FIG. 13B, a horizontal axis indicates a time (unit: second), a left vertical axis indicates a displacement (unit: millimeter), and a right vertical axis indicates a voltage of the heartbeat waveform (unit: volt). In FIG. 13B, the displacement R1 which changes with time in synchronization with the heartbeat waveform R0 is detected. As described above, it was confirmed that the displacement detection device 1 of the present preferred embodiment could accurately detect a minute displacement such as body movement caused by a heartbeat.

In order to identify a preferable measurement condition in the heartbeat measurement as illustrated in FIGS. 13A and 13B, the following simulation was conducted regarding the operation of the displacement detection device 1.

(1) Relationship Between Measurement Frame Rate and Localization Accuracy

FIG. 14 shows a simulation result regarding a relationship between the measurement frame rate and localization (displacement detection) accuracy in the displacement detection device 1. In FIG. 14, a change in the localization accuracy accompanying a change in the measurement frame rate was numerically simulated under a condition where the chirp length Tc of the transmission signal Sd as illustrated in FIG. 7A was about 10 milliseconds and a frequency band was about 80 kHz to about 20 kHz. In this example, the localization accuracy indicated dispersion of measured values when the measurement was repeated a number of times without changing the measurement condition, and 36 (three times a standard deviation of the measured values) was used.

For example, when the localization accuracy of about 20 μm (that is, about 0.02 mm) is preferable in the heartbeat measurement, in the relation illustrated in FIG. 14, it can be seen that the measurement frame rate of 30 frames per second (fps) or higher may be used. Moreover, in this measurement frame rate, a period of one frame is about 33 milliseconds. Therefore, when a distance from the displacement detection device 1 to the object 3 which is the detection target object is about 50 cm, a longest chirp length in consideration of a propagation period of a sound wave (about 3 milliseconds) is about 30 milliseconds. The longest chirp length indicates an upper limit of the chirp length Tc applicable for the transmission signal Sd of one frame.

(2) Relationship Between SNR of Reception Signal and Localization Accuracy

FIG. 15 shows a simulation result regarding a relationship between an SNR of the reception signal and the localization accuracy in the displacement detection device 1. In FIG. 15, a change in the localization accuracy accompanying a change in the SNR of the reception signal was numerically simulated under a condition where the chirp length Tc of the transmission signal Sd was about 30 milliseconds and a frequency band was about 100 kHz to about 20 kHz.

For example, when the localization accuracy of about 20 μm is preferable in the heartbeat measurement, in the relationship illustrated in FIG. 15, it can be seen that the SNR may be set to 0 decibel (dB) or higher. For example, the SNR of the reception signal can be set depending on the measurement environment by a drive voltage to drive the drive circuit of the transmitter 10.

OTHER PREFERRED EMBODIMENTS

As described above, a preferred embodiment of the present invention is described as one example of the present invention. However, the present invention is not limited to the above-described preferred embodiment, and is applicable to other preferred embodiments. Other preferred embodiments are exemplified below.

In the above-described preferred embodiment, an example in which the transmitter 10 includes the thermophone is described. The transmitter 10 is not limited to include the thermophone, and may include a ribbon tweeter, for example. Moreover, for example, the transmitter 10 may be an ultrasonic transducer using a piezoelectric vibrator, or the like.

In the above-described preferred embodiment, an example in which the transmitter 10 generates a chirp wave by a linear frequency chirp is described. In the present preferred embodiment, for example, the transmitter 10 may generate a chirp wave by a linear period chirp whose period linearly changes with time. Moreover, for example, the transmitter 10 may generate a wideband modulated wave using a spreading code such as an M-sequence code or a gold code.

In the above-described preferred embodiment, an example is described in which the chirp signal by the pulse interval modulation is used as the transmission signal Sd in the displacement detection device 1. In the present preferred embodiment, the displacement detection device 1 is not limited to generate the transmission signal Sd by the pulse interval modulation, and may generate the transmission signal Sd by pulse width modulation in which a time width of each pulse in the successive pulses changes with time, for example.

In the above-described preferred embodiment, an example in which the transmitter 10 generates a sound wave is described. The displacement detection device 1 of the present preferred embodiment is not necessarily limited to the use of the transmitter 10 which generates a sound wave, but may use a transmitter 10 which generates an electromagnetic wave, for example. Also in this case, accurate detection of a minute displacement of an object is achievable through analysis of a phase difference of analytic signals, by using signals acquired by transmission and reception of wideband electromagnetic waves whose frequency changes with time.

In the above-described preferred embodiment, an example in which the displacement detection device 1 is provided with one transmitter 10 and one receiver 11 is described. In the present preferred embodiment, one or both of the transmitter and the receiver provided to the displacement detection device 1 may include a plurality of transmitters or/and receivers.

In other preferred embodiments as described above, for example, a description of features in common with the above-described preferred embodiment is omitted, and only different points have been described. The individual preferred embodiments are merely exemplary, and partial replacement or combination of configurations described in different preferred embodiments is possible.

Preferred embodiments of the present invention are applicable to displacement detection devices, methods, and non-transitory media including computer programs, and are applicable to, particularly, detection of a minute displacement of an object.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A displacement detection device comprising:
   a transmitter to transmit, to an object, a modulated wave including a plurality of frequencies;
   a receiver to receive a reflection wave from the object and generate a reception signal indicating a reception result; and
   a controller configured or programmed to control transmission of the modulated wave by the transmitter and acquire the reception signal from the receiver; wherein
   the controller is configured or programmed to:
      output a first transmission signal to the transmitter to transmit the modulated wave and acquire a responsive first reception signal in a first measurement period;
      extract, based on the first transmission signal and the first reception signal, first phase information indicating a phase defined in a correlation between the first transmission signal and the first reception signal;
      output a second transmission signal to the transmitter to transmit the modulated wave and acquire a responsive second reception signal in a second measurement period after the first measurement period;
      extract, based on the second transmission signal and the second reception signal, second phase information indicating a phase defined in a correlation between the second transmission signal and the second reception signal; and
      detect a displacement of the object between the first and second measurement periods, depending on a difference between the first phase information and the second phase information.

2. The displacement detection device according to claim 1, wherein the controller is configured or programmed to:
   generate, based on the first transmission signal and the first reception signal, a first analytic signal including an amplitude and the phase defined in the correlation between the first transmission signal and the first reception signal, and extract the first phase information from the first analytic signal; and
   generate, based on the second transmission signal and the second reception signal, a second analytic signal including an amplitude and the phase defined in the correlation between the second transmission signal and the second reception signal, and extract the second phase information from the second analytic signal.

3. The displacement detection device according to claim 2, wherein the controller configured or programmed to:
   detect a timing at which at least one of the amplitude of the first analytic signal and the amplitude of the second analytic signal becomes largest; and calculate the difference between the first phase information and the second phase information using the detected timing as a reference timing.

4. The displacement detection device according to claim 3, wherein the controller is configured or programmed to measure a displacement amount indicating the displacement of the object, based on the difference between the first phase information and the second phase information and a slope of the phase at the reference timing.

5. The displacement detection device according to claim 2, wherein the controller is configured or programmed to calculate at least one of an envelope of the first analytic signal and an envelope of the second analytic signal, and detect a timing at which the amplitude becomes the largest based on the calculated envelope.

6. The displacement detection device according to claim 2, wherein the controller is configured or programmed to:
   calculate a cross-correlation function between the first transmission signal and the first reception signal to be complexified and generate the first analytic signal, based on the first transmission signal and the first reception signal; and
   calculate a cross-correlation function between the second transmission signal and the second reception signal to be complexified and generate the second analytic signal, based on the second transmission signal and the second reception signal.

7. The displacement detection device according to claim 1, wherein the transmitter includes a thermophone to transmit, as the modulated wave, a sound wave including a plurality of frequencies.

8. The displacement detection device according to claim 1, wherein the first transmission signal and the second transmission signal cause the transmitter to transmit the modulated wave by a linear frequency chirp.

9. A displacement detection method comprising, by a controller to control a transmitter to transmit, to an object, a modulated wave including a plurality of frequencies and acquire, from a receiver to receive a reflection wave from the object, a reception signal indicating a reception result:
   outputting a first transmission signal to the transmitter to transmit the modulated wave and acquiring a responsive first reception signal in a first measurement period;
   extracting, based on the first transmission signal and the first reception signal, first phase information indicating a phase defined in a correlation between the first transmission signal and the first reception signal;
   outputting a second transmission signal to the transmitter to transmit the modulated wave and acquiring a responsive second reception signal in a second measurement period after the first measurement period;
   extracting, based on the second transmission signal and the second reception signal, second phase information indicating a phase defined in a correlation between the second transmission signal and the second reception signal; and
   detecting a displacement of the object between the first and second measurement periods, depending on a difference between the first phase information and the second phase information.

10. The displacement detection method according to claim 9, further comprising:
   generating, based on the first transmission signal and the first reception signal, a first analytic signal including an amplitude and the phase defined in the correlation between the first transmission signal and the first reception signal, and extracting the first phase information from the first analytic signal; and generating, based on the second transmission signal and the second reception signal, a second analytic signal including an amplitude and the phase defined in the correlation between the second transmission signal and the second reception signal, and extracting the second phase information from the second analytic signal.

11. The displacement detection method according to claim 10, further comprising:

detecting a timing at which at least one of the amplitude of the first analytic signal and the amplitude of the second analytic signal becomes largest; and calculating the difference between the first phase information and the second phase information using the detected timing as a reference timing.

12. The displacement detection method according to claim 11, further comprising measuring a displacement amount indicating the displacement of the object, based on the difference between the first phase information and the second phase information and a slope of the phase at the reference timing.

13. The displacement detection method according to claim 10, further comprising calculating at least one of an envelope of the first analytic signal and an envelope of the second analytic signal, and detecting a timing at which the amplitude becomes the largest based on the calculated envelope.

14. The displacement detection method according to claim 10, further comprising:

calculating a cross-correlation function between the first transmission signal and the first reception signal to be complexified and generate the first analytic signal, based on the first transmission signal and the first reception signal; and calculating a cross-correlation function between the second transmission signal and the second reception signal to be complexified and generate the second analytic signal, based on the second transmission signal and the second reception signal.

15. The displacement detection method according to claim 9, wherein the transmitter includes a thermophone to transmit, as the modulated wave, a sound wave including a plurality of frequencies.

16. The displacement detection method according to claim 9, wherein the first transmission signal and the second transmission signal cause the transmitter to transmit the modulated wave by a linear frequency chirp.

17. A non-transitory computer readable medium storing a program to cause a controller to execute the displacement detection method according to claim 9.

* * * * *